United States Patent
Li et al.

(10) Patent No.: US 6,565,776 B1
(45) Date of Patent: May 20, 2003

(54) LENS MOLDS WITH PROTECTIVE COATINGS FOR PRODUCTION OF CONTACT LENSES AND OTHER OPHTHALMIC PRODUCTS

(75) Inventors: Hongwen Li, Palo Alto, CA (US); Dominic V. Ruscio, Webster, NY (US); Yu Chin Lai, Pittsford, NY (US); Horngyih Huang, Penfield, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 227 days.

(21) Appl. No.: 09/593,656

(22) Filed: Jun. 12, 2000

Related U.S. Application Data

(60) Provisional application No. 60/138,723, filed on Jun. 11, 1999.

(51) Int. Cl.[7] .................................................. B29D 11/00
(52) U.S. Cl. ................ 264/2.5; 249/114.1; 249/115; 249/134; 425/808
(58) Field of Search ......................... 264/1.1, 2.5, 219, 264/338; 425/808; 249/114.1, 115, 116, 134, 135

(56) References Cited

U.S. PATENT DOCUMENTS

| | | | |
|---|---|---|---|
| 3,673,055 A | 6/1972 | Sheld ............................ | 161/183 |
| 3,916,033 A | 10/1975 | Merrill ........................... | 427/36 |
| 4,159,292 A | 6/1979 | Neefe ............................ | 264/1 |
| 4,661,573 A | 4/1987 | Ratkowski .................... | 526/245 |
| 4,701,288 A | 10/1987 | Cook et al. ................... | 264/1.4 |
| 4,882,238 A | 11/1989 | Yoshioka et al. ............ | 428/698 |
| 4,957,663 A | 9/1990 | Zwiers et al. ................ | 264/1.4 |
| 4,983,702 A | 1/1991 | Mueller et al. ............... | 528/25 |
| 5,010,155 A | 4/1991 | Mueller ........................ | 527/301 |
| 5,096,626 A | 3/1992 | Takamizawa et al. ........ | 264/1.7 |
| 5,328,954 A | 7/1994 | Sarangapani ................. | 524/589 |
| 5,352,714 A | 10/1994 | Lai et al. ...................... | 523/107 |
| 5,540,410 A | 7/1996 | Lust et al. .................... | 249/134 |
| 5,611,970 A | 3/1997 | Apollonio et al. ............ | 264/2.5 |
| 5,632,936 A | 5/1997 | Su et al. ....................... | 264/2.5 |
| 5,639,510 A | 6/1997 | Kindt-Larsen et al. ....... | 427/133 |
| 5,674,557 A | 10/1997 | Widman et al. .............. | 427/133 |
| 5,690,865 A | 11/1997 | Kindt-Larsen et al. ....... | 264/1.38 |
| 5,779,943 A | 7/1998 | Enns et al. .................... | 264/1.7 |
| 5,837,314 A | 11/1998 | Beaton et al. ................ | 427/133 |
| 5,849,209 A | 12/1998 | Kindt-Larsen et al. ....... | 249/134 |
| 5,849,222 A | 12/1998 | Jen et al. ...................... | 264/2.3 |
| 5,882,698 A | 3/1999 | Su et al. ....................... | 425/215 |

FOREIGN PATENT DOCUMENTS

| | | | |
|---|---|---|---|
| EP | 0 362 137 A | 4/1990 | ............... C08J/7/04 |
| EP | 0 677 373 A1 | 4/1995 | ........... B29D/11/00 |
| EP | 0 686 484 A2 | 6/1995 | ........... B29D/11/00 |
| JP | 2-60721 | * 3/1990 | |

OTHER PUBLICATIONS

Patent Abstracts of Japan; vol. 007, No. 275 (M–261), Dec. 8, 1983 & JP 58 153608 A (Sumitomo Bakelite KK), Sep. 12, 1983 abstract.

* cited by examiner

Primary Examiner—Mathieu D. Vargot
(74) Attorney, Agent, or Firm—John E. Thomas

(57) ABSTRACT

This invention relates to the preparation of molds for the production of contact lenses and other ophthalmic articles. By using an inorganic material to coat the optical surfaces and sidewalls of mold parts made from clear-resin materials, manufacturers can produce lens molds with greater dimensional stability and chemical resistance. In addition to protecting the clear resin from interaction with otherwise reactive monomers from which the molded article is made, such coatings can also be used to achieve preferential release of the molded article. The resulting mold is especially useful for providing an economical way to improve manufacturing quality of contact lenses.

40 Claims, 1 Drawing Sheet

Figure 1:
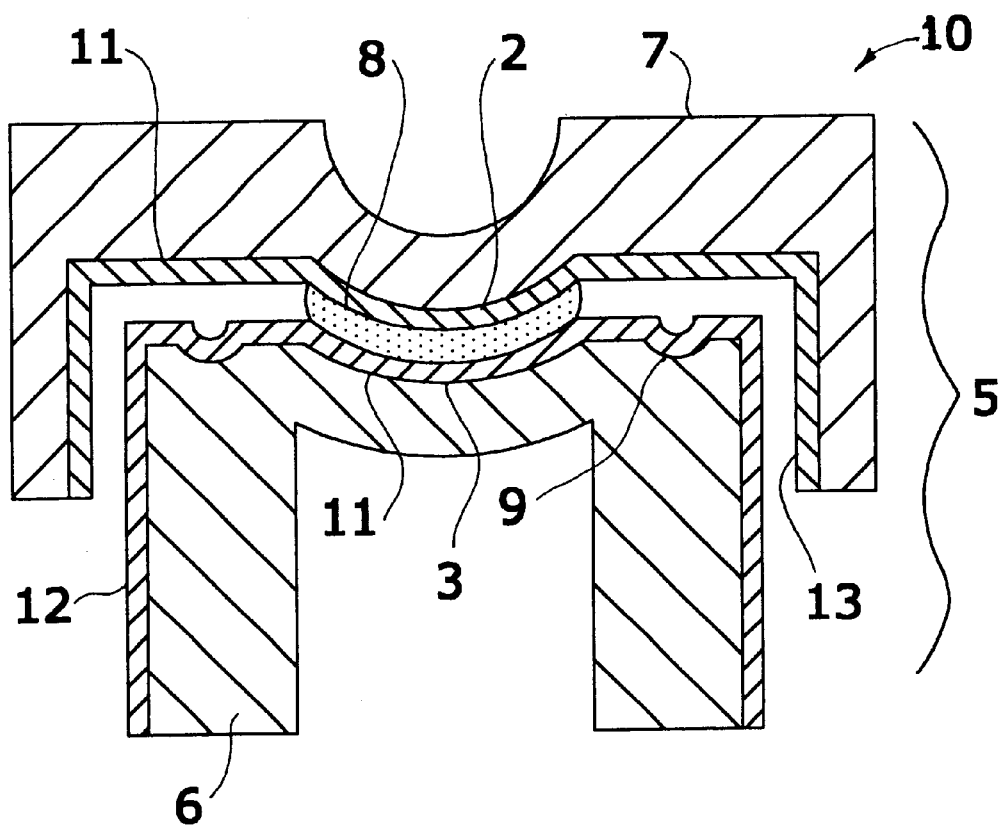

LENS MOLDS WITH PROTECTIVE COATINGS FOR PRODUCTION OF CONTACT LENSES AND OTHER OPHTHALMIC PRODUCTS

This application claims the benefit of U.S. Provisional Application No. 60/138,723 filed on Jun. 11, 1999.

TECHNICAL FIELD

This invention is directed to improved lens molds for the production of contact lenses, intraocular lenses, and other ophthalmic products. In particular, the invention involves protective coatings for allowing for the use of mold materials having improved dimensional stability and/or increased light transparency. The invention is also directed to a method of making the improved lens molds and their use in the manufacture of contact lenses.

BACKGROUND

The molds used in the manufacture of soft (hydrogel) contact lenses have been made from a variety of rigid thermoplastic resins. For example, U.S. Pat. No. 5,540,410 to Lust et al and U.S. Pat. No. 5,674,557 to Widman et al. disclose mold halves made from polystyrene, polyvinyl chloride, polyethylene, polypropylene, copolymers of polystyrene with acrylonitrile and/or butadiene, acrylates such as polymethyl methacrylate, polyacrylontrile, polycarbonate, polyamides such as nylons, polyesters, polyolefins such as polyethylene, polypropylene and copolymers thereof, polyacetal resins, polyacrylethers, polyarylether sulfones, and various fluorinated materials such as fluorinated ethylene propylene copolymers and ethylene fluoroethylene copolymers. Polystyrene is preferred by Widman et al because it does not crystallize and has low shrinkage. An earlier patent, U.S. Pat. No. 4,661,573 to Ratkowski et al, discloses, for the processing of fluorosilicone copolymers into extended wear lenses, molds formed of polypropylene, polyethylene, nylon, Teflon®, glass, or aluminum having its mold surfaces coated with Teflon® polymer.

The manufacturers of soft contact lenses have discovered that if the molds used to make the lenses are sufficiently inexpensive, it is more economical to discard the molds after production of the lenses from the molds than it is to clean the molds to be reused. Polypropylene is a good example of an inexpensive resin that has been used to make molds that can be discarded at minimal cost. Another advantage of polypropylene is that unlike many resins, polypropylene can resist interaction with the monomers used to make the contact lenses. The ability to resist chemical interaction prevents the lens and the mold from adhering to each other and simplifies their separation following lens production.

Despite these benefits, however, polypropylene lens molds also suffer from several known disadvantages. One disadvantage is polypropylene's relatively low dimensional stability. As mentioned by Widman et al, polypropylene partly crystallizes during cooling from the melt and is, therefore, subject to shrinkage, causing difficulties in controlling dimensional changes after injection molding. To improve dimensional stability, manufacturers can make polypropylene lens molds thicker. However, while thicker polypropylene molds can have greater stability, they also require additional cooling time. The additional time needed to cool the thicker molds decreases the number of molds that can be made per machine per unit of time. Furthermore, thicker and therefore larger polypropylene molds can limit the number of molds per machine, thereby reducing product throughput. Finally, polypropylene's relatively poor dimensional stability limits manufacturing yield, because the molds may need to be stored before use, for periods of up to several weeks in some cases, and many polypropylene molds fail to maintain dimensional stability over time to a degree that eventually renders them unfit for lens production.

In addition to having relatively poor dimensional stability, polypropylene has other disadvantages. Polypropylene is a translucent resin that reduces the transmission of light. Typically, polypropylene allows only about ten percent of light to pass through it. Poor light transmission reduces the speed of polymerization. Furthermore, the absorption of oxygen by the molds, commonly experienced with polypropylene molds, can influence lens quality. When the absorbed oxygen diffuses out, during lens molding, polymerization can be affected, and lens surface quality can suffer as a result.

Several alternative resins offer greater dimensional stability and light transmittance than polypropylene. For instance, polycarbonate and polystyrene are more amorphous resins and, therefore, have greater dimensional stability than polypropylene. Moreover, these and other "clear" resins generally transmit at least 50% and often more than 70% of light.

Although polycarbonate and polystyrene resins offer greater dimensional stability and light transmittance, they are vulnerable to chemical interaction with the monomers used in many soft contact lenses (for example, N-vinylpyrrolidone and N,N-dimethylacrylamide, used in many conventional contact lenses). Chemical interaction between the lens monomers and the lens molds can cause the lens and the mold to adhere to each other and, in a worst case scenario, the lens and the mold can become permanently joined. Moreover, in addition to being susceptible to chemical interaction, many clear resins are more expensive than polypropylene and are, therefore, too costly to discard.

Molds for making soft contact lenses have been treated to affect their surface properties. For example, U.S. Pat. No. 4,159,292 discloses the use of silicone wax, steric acid, and mineral oil as additives for plastic mold compositions to improve the release of the contact lens from the plastic molds. U.S. Pat. No. 5,690,865 discloses an internal mold release agent such as waxes, soaps, and oils, including a polyethylene wax having a molecular weight of 5,000 to 200,000 or a silicone polymer having a molecular weight of 2,000 to 100,000. U.S. Pat. No. 5,639,510 to Kindt-Larsen discloses a surface-applied surfactant in the form of a uniform layer or very thin film or coating to assist in the release from each other of mold components of a multi-part mold employed in the molding of hydrophilic contact lenses. Polymeric surfactants that can be used include polyoxyethylene sorbitan mono-oleates which are applied to a non-optical surface of the mold, but do not cover the optical surface of the mold.

U.S. Pat. No. 5,674,557 to Widman et al discloses hydrophilic contact-lens molds that are transiently modified with a removable surfactant to provide a low water dynamic contact angle. This was found to reduce lens hole defects in lens manufacture. Widman et al discloses various polysorbates, ethoxylated amines, or quaternary ammonium compounds that can be applied to the mold surface by swathing, spraying, or dipping.

Mueller et al, in European Patent Application EP 0 362 137 A1, discloses the coating of molds with a co-reactive hydrophilic polymer like polyvinylalcohol, ethoxylated PVA, or hydroxyethyl cellulose, in order to provide a permanent hydrophilic coating on the lens. The mold coating copolymerizes with the lens material in the mold. Similarly, Merill, in U.S. Pat. No. 3,916,033, discloses coating the surface of a mold with polyvinylpyrrolidone to form a coating that is later to come into contact with a previously crosslinked silicone lens. Merill teaches spreading a coating solution over the mold while held in a chuck, thereby achieving a fairly uniform coating of several thousandths of an inch, after which the wet film is allowed to dry to form a hard glassy polymer layer of about 1 to 5 thousandths of an inch. Finally, monomeric N-vinyl pyrrolidone is dissolved in the coating ready for contact with the silicone lens. As one other example, U.S. Pat. No. 5,779,943 to Enns et al. discloses coating a mold with a hydrophobic latent-hydrophilic material, after which a lens material is molded therein. During curing, the mold coating is apparently transferred to the lens surface. The lens is then treated to convert the coating to a hydrophilic form.

It is an object of our system to provide the manufacturer of contact lens and other ophthalmic articles placed on or in the eye with an improved way to mold them, by providing molds with greater light transparency or dimensional stability which can be stored for an extended period of time while, concurrently, maintaining the chemical resistance of the molds to a variety of monomers used in making the ophthalmic articles. This combination of mold properties can be economically achieved by use of the present invention, and may even be achieved in molds that are discarded after a single use.

SUMMARY OF THE INVENTION

Our system uses clear-resin lens molds with protective coatings for the production of contact lenses, intraocular lenses, delivery devices, and other such ophthalmic articles. Clear resins are not only more amorphous and, therefore, more dimensionally stable than polypropylene, but are also capable of transmitting a greater percentage of actinic light. Various clear resins are suitable for contact lens molding purposes, including polyvinyl chloride (PVC), polyester, polysulfone, polyacrylate/polymethacrylate, polycarbonate, and polystyrene.

Polycarbonate, polystyrene, or polyacrylate materials are particularly preferred. These resins offer great dimensional stability and light transmittance; but unlike many other clear resins, they are also relatively inexpensive. Despite the advantages associated with clear-resin lens molds, it is commonly known that clear resins have a tendency to interact with monomers used in contact lens production. Until now, manufacturers have only been able to develop a limited number of clear-resin lens molds that can effectively resist chemical monomer interaction. Unfortunately, existing clear-resin lens molds may be too expensive, especially to discard after single-use, or may only offer resistance to limited kinds of monomer materials used in the manufacture of ophthalmic articles.

The present invention is directed to clear-resin molds and methods of producing clear-resin molds, used for making ophthalmic articles, having a permanent (non-transient), dense, uniform, and continuous protective inorganic coating on the surface of the mold, including at least the optical surfaces thereof, to prevent adverse monomer chemical interactions. Although several coating techniques are capable of applying such a coating, including evaporation, sputtering, spraying, and photo-chemical vapor deposition, the preferred embodiment for applying a protective coating to the mold employs plasma-enhanced chemical vapor deposition (PECVD) or other plasma glow discharge techniques, which make such coatings generally uniform, continuous, dense, and pinhole free. The coating, during molding of the ophthalmic article, is essentially inert or non-reactive with the lens monomers or lens surface that is formed in the mold assembly. On the contrary, the purpose of the coating is to prevent chemical interaction of the mold with the polymerizable monomers used in making the opthalmic article.

A variety of inorganic coating materials that can be used to prevent monomer chemical interaction with the underlying mold surfaces. Suitable coatings include silicon and metal oxides, carbides, and nitrides. Of these, $SiO_x$, SiON, $Si_3N_4$, $TiO_2$, $Ta_2O_5$, and $Al_2O_3$ have been found to be particularly effective. These inorganc coatings, which do not contain carbon as a principal element, can have minor amounts of carbon or H and may be formed from carbon-containing compounds or precursors.

Although the above-listed coating materials are preferred because of their ability to transmit actinic radiation and to protect against monomer interaction, there are other materials that, despite their diminished capacity to transmit light, can be used to prevent monomer interaction. Furthermore, materials for contact lenses, for instance, can also be cured by sources of energy other than light (for example, by heat or microwave energy wherein transmission of light is unnecessary for curing). In such cases, metal nitrides such as TiN or AlN or metal carbides such as TiC or SiC, which do not transmit light, can be used to protect against monomer interaction with the mold material. Moreover, even when employing light to cure a lens material, it may not be essential that light be able to transmit through both female and male mold parts since light is generally directed from only one side of the lens mold. Therefore, in cases where light for curing a lens or other article only needs to be directed from one side, mold materials with limited light transmittance can be applied only to the mold cavity surfaces through which light transmission is not essential. For example, by coating one mold part with a light-transmitting coating material and the other with a coating material having poor light transmittance, manufacturers can produce a clear-resin lens mold that is well suited for contact lens production.

Although a single coating can be used to protect the cavity surfaces of mold parts, multiple coatings formed from different materials can also be used. Even if more costly to apply multiple coatings to the mold cavity surfaces, the presence of multiple layers may provide enhanced protection against monomer interaction and may facilitate release of a molded article from the mold. For example, anywhere from one to five layers or more of an inorganic coating can be economically applied to a mold part. Also, besides preventing monomer interaction with clear resins used to make mold parts, additional advantages of significance can also be obtained by use of mold coatings according to the present invention. For example, mold coatings according to the present invention can also be used to improve mold separation, prevent adhesion, and achieve preferential release.

By eliminating the risk of chemical interaction, manufacturers can mold contact lenses or other opthalmic products using clear-resin molds with improved dimensional stability and light transmittance. Moreover, the application of a coating to the mold cavity surfaces can also accomplish preferential release. For example, our system simplifies and economizes lens production by reducing mold cycle time, increasing product throughput, improving lens quality, and increasing the speed of polymerization.

These and other objects of the invention can be better understood by reference to the Sole Figure in combination with the following detailed description of the invention.

DRAWING

FIG. 1 (Sole FIGURE) is a cross-sectional view of a monomer-filled contact lens mold with an applied protective coating according to the present invention.

DETAILED DESCRIPTION

Although the invention is applicable to the molding of a variety of ophthalmic products placed on or in the eye, for example, intraocular lenses, contact lenses, delivery devices for therapeutic agents, and the like. The invention is especially useful and advantageous for cast molding soft or hydrogel contact lenses. By way of example, therefore, the invention will be described with reference to the molding of a contact lens.

Referring to FIG. 1, a representative mold assembly 5 according to the present invention is shown. The mold assembly includes posterior mold 7 having a posterior mold cavity defining surface 2 (which forms the posterior surface of the molded lens) and anterior mold 6 having an anterior mold cavity defining surface 3 (which forms the anterior surface of the molded lens). Each of the mold sections is injection molded from a clear resin in an injection molding apparatus. When the mold sections are assembled, a mold cavity is formed between the two defining surfaces that correspond to the desired shape of a contact lens 8 molded therein. Because monomer overflow often occurs during clamping of the lens mold parts during production, the anterior lens mold part 6 is often configured to include a monomer overflow reservoir 9.

In general, molded lenses are formed by depositing a curable liquid such as a polymerizable monomer and/or macromer into a mold cavity, curing the liquid into a solid state, opening the mold cavity and removing the lens. Other processing steps such as hydration of the lens can then be performed. Conventional molding techniques and the details of mold structures in a particularly preferred embodiment are disclosed, for example, in commonly assigned U.S. Pat. No. 5,466,147 to Appleton et al., herein incorporated by reference in its entirety. Other conventional molding techniques and molds that can be used in accordance with the present invention (for example, wherein a plurality of male sections having convex molding sections and a plurality of female sections having concave molding surfaces are integrally formed or commonly supported on frames) are disclosed in U.S. Pat. No. 5,820,895 to Widman et al, U.S. Pat. No. 5,540,410 to Lust et al, and U.S. Pat. No. 4,640,107 to Larsen.

In the embodiment of FIG. 1, the mold assembly 5 for molding soft (hydrogel) contact lenses uses clear-resin molds 5 with treated cavity surfaces 2, 3 to prevent monomer chemical interaction. As mentioned above, clear resins are more amorphous and more dimensionally stable than crystalline resins. To ensure mold performance, we prefer to use a clear resin that has sufficient dimensional stability. In the final mold, any deviations from the intended radius of curvature of the molds are within ±20 microns up to six months after their production, preferably for any period from one day to six months after their production, while the molds are at room temperature, namely about 25° C. In addition to having greater dimensional stability, clear resins can also transmit a greater percentage of actinic light energy. Again, to ensure optimum mold performance, we prefer to use a clear resin that can transmit at least 20% of actinic light energy, preferably at least 50% of the actinic light emitted from the light source, in the case of a lens manufacturing process employing UV curing. However, the present invention is not limited to manufacturing processes employing curing by light energy, and the molds described herein can be designed, by way of example, for thermal or microwave curing, in which case light transmission is no longer important.

There are many clear resins that are suitable for molding soft lenses, including: polyvinyl chloride (PVC), polycarbonate, polystyrene, polyester, polysulfone, and polyacrylate/polymethacrylate. Of these, we prefer to use either polycarbonate, polystyrene, or polymethacrylate, which offer improved dimensional stability and light transmittance and which are also available to manufacturers at a relatively low cost. This reduces the expense associated with discarding the molds 5 after use, according to a preferred process of the present invention.

As mentioned above, although clear-resin lens molds 5 are, in many ways, well suited for contact-lens production, they are vulnerable to monomer chemical interaction. To prevent undesirable monomer interaction, we coat the optical surfaces 2, 3 of the lens mold parts with a dense, uniform, and continuous protective coating 11. Moreover, we also prefer to coat the cavity side-walls 12, 13 of each mold part to further facilitate separation and to prevent adhesion. The coating 11 acts as a barrier between a lens monomer 8 and the lens mold cavity surfaces and prevents interaction. By preventing interaction, manufacturers can keep the lens mold 5 and lens monomer 8 from adhering and becoming permanently joined during production.

The protective mold coating is non-reactive with the lens material in the mold. The protective coating should have sufficient thickness to prevent interaction of the mold material with the monomers used to make the lens. An effective coating is typically between 10 nm and 5 μm thick. It is also desirable to apply the protective coating so that all mold cavity surfaces of the lens mold parts are adequately covered including mold grooves and curved surfaces.

The coating 11 should be applied using a technique that guarantees coating density, thickness, uniformity, and continuity. Various coating techniques are commercially available for applying protective coatings 11 to mold surfaces including: evaporation, sputtering, dip/spin coating, spraying, photo-chemical vapor deposition, plasma-enhanced chemical vapor deposition (PECVD), and other plasma glow discharge techniques. Of these, we have found it to be particularly advantageous to use PECVD applied coatings. PECVD involves creating plasma in the vapor phase using means such as RF excitation to activate or stimulate a reaction between coating materials and reactants. Generally, a liquid precursor material is vaporized and introduced along with an oxidizer into a vacuum chamber. The liquid precursor is subsequently decomposed and reacted to form a film under plasma conditions. The vacuum required for this process is moderate compared to other deposition technologies, and the coating growth rate is high. Moreover, the reaction can be achieved without having to introduce additional heat. PECVD coatings are ideal for lens production purposes; the coatings are glass-like, flexible, thin, dense, uniform, continuous, and pin-hole free.

Although the technique used to apply the protective coating 11 is significant, it is equally important to select an appropriate coating material. A suitable coating material must be resistant to lens monomer chemical interaction.

When light is used to cure the lens, the coating material should be capable of allowing the transmission of light energy. Again, numerous coating materials are available that exhibit these characteristics. Some suitable materials include silicon and metal oxides, nitrides, and carbides. Such inorganic materials can be formed from inorganic compounds and/or by certain organic or organometallic compounds which are precursors to the coating material. For example, TMDSO (trimethyldisiloxane) can be used as a precursor of a silicon oxide inorganic coating that may contain minor amounts of carbon in terms of relative mole percent and at least about 70% (mole percent) of the non-carbon containing component (silicon dioxide), more preferably at least about 90% of the non-carbon containing component (silicon dioxide).

Examples of effective coating materials that are preferred include: $SiO_x$, SiON, $Si_3N_4$, $TiO_2$, $Ta_2O_5$, and $Al_2O_3$, especially for the molding of contact lenses empolying UV curing. However, when lens manufacturers do not need molds that transmit actinic light energy, they can also use coating materials that do not transmit actinic light. Materials like metal nitrides and metal carbides, for instance TiN, AlN, TiC, and SiC, are effective in preventing monomer interaction but are relatively poor transmitters of light energy. Since actinic radiation is often directed from only one side of the lens mold 5 during curing, lens makers can produce a clear-resin lens mold assembly 5 that has one mold part that is coated with a light-transmitting coating material and a second lens mold part coated with a coating material that has poor light transmittance. A lens mold assembly 5 coated in this manner is well suited for lens production.

The applied coating 11 can be a single-layer, single-material coating; or alternatively, the coating 11 can also include multiple layers of different coating materials. Although multi-layering will increase production costs, it may improve the resistance to monomer interaction.

In addition to preventing undesirable monomer interaction, our coated lens mold assembly 5 can also provide preferential lens release. Preferential release involves the ability of lens makers to make lens molds that are capable of causing a finished lens to stay consistently with one of either the posterior or anterior mold part upon release. In other words, it refers to the ability to make the lens mold so that the finished lens remains with a "preferred" lens mold part upon separation. By selecting the appropriate coating materials for both the female and male mold sections, lens makers can alter the hydrophobic or hydrophilic quality of the lens mold cavity coatings and can achieve preferential release. For example, by controlling the ratio of oxygen to precursor used to form a mold coateing, for example in forming an silicon oxide coating, the coating, the relative hydrophilicity of the coating can be adjusted. The higher the ratio, the more hydrophilic the coating. Thus, by selecting the appropriate coating materials, lens makers can effectively adjust the hydrophilic or hydrophobic quality of the mold cavity coatings 11 and can establish a "preferred" mold part. In doing this, lens makers can essentially alter the mold cavity surfaces so that a finished lens will remain with only the intended lens mold part, either the anterior or the posterior as the case may be, upon separation. The ability to achieve preferential release is beneficial not only for clear-resin molds, but can also be used in lens molds made from materials that are not vulnerable to monomer interaction.

The resulting mold assembly 5 exhibits improved dimensional stability and light transmittance and can optionally also achieve preferential release. By using our mold assembly 5, contact lens manufacturers can simplify and economize lens production by reducing the lens mold cycle time, improving lens quality, increasing polymerization speed, and increasing production throughput. It should be noted that coated molds as described herein can be used in the thermal curing of the same or similar formulations and monomers as used in light curing to give shaped articles such as contact lenses. Alternatively, for example, a UV main cure can be followed by a thermal secondary cure (heat post-cure).

The following specific experiments and examples demonstrate the compositions and methods of the present invention. However, it is to be understood that these examples are for illustrative purposes only and do not purport to be wholly definitive as to conditions and scope.

EXAMPLE 1

This Example illustrates the preparation of a contact lens mold with a silicon nitride coating using plasma-enhanced chemical vapor deposition (PECVD). Polystyrene molds were placed in a stainless steel chamber equipped with a capacitatively coupled radio frequency (13.56 MHz) power supply. The chamber was evacuated using a turbo-molecular pump. After pumping down to a base pressure of $10^{-4}$ Torr, working gases were admitted using mass flow controllers (MFC). The desired pressure was achieved using a throttle value and a MKS baraton capacitance pressure gauge. The process gases used for the silicon nitride deposition (wherein the ration of silicon to nitrogen was approximately 2.3) included silane and ammonia ($SiH_4/NH_3$) in a 1:4 ratio. The deposition pressure was 80 to 100 mTorr, and the substrate temperature during deposition was approximately 40 to 60° C. The flow rates of $SiH_4$ and $NH_3$ were 10 to 20 and 40 to 80 sccm, respectively. The coating thickness was in the range of 60 nm to 120 nm.

EXAMPLE 2

This Example illustrates the preparation of a contact-lens mold with a silicon oxide coating using plasma-enhanced chemical vapor deposition (PECVD). Using a setup similar to the setup described in Example 1, a contact lens mold was coated with silicon oxide. The working gases used to obtain the coating was trimethyldisiloxane and oxygen wherein the ratio of trimethyldisiloxane to oxygen was 1:2. The coating thickness was between 600 nm and 1000 nm.

EXAMPLE 3

This Example illustrates the chemical resistance of plastics coated according to the present invention. Flat samples of amorphous plastics (polystyrene, polycarbonate, and polysulfone) were exposed to one drop of Monomer Mix A and B used for lens casting, respectively a non-silicone soft lens and a silicone soft lens. Monomer Mix A comprised the following components: 2-Hydroxyethyl methacrylate (32 parts), N-vinyl pyrrolidone or NVP (45 parts), 2-Hydroxy-4-t-butylcyclohexyl methacrylate (8 parts), ethyleneglycol dimethacrylate (0.1 parts), methacryloxyethyl vinyl carbonate (0.5 part), glycerine (15 parts), a polymerizable blue tint (150 ppm), and an initiator Darocur (0.2 parts). Monomer Mix B comprised the following components: a polyurethane-polysiloxane prepolymer derived from isophorone diisocyanate, diethylene glycol, αω-hydroxybutyl polydimethylsiloxane of molecular weight 4000, and 2-hydroxyethyl methacrylate at the molar ratio of 6:3:2:2 (50 parts), 3-methacryloxypropyl tris(trimethylsiloxy)silane or TRIS (20 parts), N,N-dimethyl acrylamide or DMA (30 parts), N-hexanol (20 parts), a benzotriazole-based polymerizable UV blocker (0.5 parts), a polymerizable blue tint (150 ppm), and a photoinitiator, Igracure-819 (0.5 part). After five minutes, the monomer drops were rubbed away using a kimwipe. After removing the monomer, the samples were observed. The surfaces of the plastic samples had become rough and opaque, indicating that there had been an interaction with the monomer ingredients (DMA or NVP). However, when the same monomer mixes were applied to silicone nitride-coated polystyrene molds according to Example 1, there was no change in surface appearance.

EXAMPLE 4

This Example illustrates lens casting (with the Monomer Mix A of Example 3) by cast molding, using polystyrene molds with PECVD-applied silicon nitride coatings according to Example 1. Anterior mold parts were charged with 60 mg (more than needed) of the monomer mix. The anterior mold parts were then capped with posterior mold parts. The molds were clamped and placed under an UV light source for 15 minutes. Following UV irradiation, the molds were then heat cured in an oven at 60° C. for 60 minutes to ensure that the monomer mix was fully cured. After curing, the molds were found impossible to separate. This was due to the reservoir area of the molds not being sufficiently coated with silicon nitride, resulting in chemical attack of the uncoated mold surface in that reservoir area by the monomer mix in the reservoir area, particularly after capping the mold.

In a second attempt, an anterior mold was charged with 28 mg of monomer mix such that the mold cavity (between posterior and anterior mold parts) was underfilled, meaning there was no monomer overflow that entered the improperly coated mold reservoir. After repeating the curing process set forth above, the molds were easily separated. Following separation, the lens stayed with the anterior mold part and was later released in water. These results indicated that the surface of the coated mold provided good chemical resistance to the monomer mix.

EXAMPLE 5

This Example illustrates lens casting (of the Monomer MIX B in Example 3) by cast molding using polystyrene molds with PECVD-applied silicon nitride coatings. The anterior mold parts were charged with 60 mg (in excess of what is required) of monomer mix and then capped with posterior lens mold parts. The overflow of the monomer mix was collected by the lens reservoir. In addition, some of the anterior mold parts were charged with 28 mg of monomer mix such that the mold cavity (between the posterior and anterior mold parts) was under-filled. The molds were then clamped and placed under a visible light source for 60 minutes to cure the monomer mix. All the molds that were underfilled were easily separated. (Some compositions, such as certain silicone hydrogels can be easily separated irrespective of underfilling or not.) Following separation, the lenses which stayed with the posterior mold parts were released from the molds in less than one hour in a 50/50 water/isopropanol solution. The surface characterization of the lenses indicated that there was no silicone nitride on the lens surface.

Many other modifications and variations of the present invention are possible in light of the teachings herein. It is therefore understood that, within the scope of the claims, the present invention can be practiced other than as herein specifically described.

We claim:

1. A mold assembly for the manufacture of at least one ophthalmic article used in or on the eye, which mold assembly comprises a mateable pair of mold parts made from a clear-resin mold material wherein the cavity surfaces of the mold parts comprises a coating of an inorganic material to protect the mold parts from attack by monomer used in making the ophthalmic article, which protective coating is permanently and externally applied to the cavity surfaces of the mold assembly and is essentially non-reactive with the surface of the ophthalmic article formed by the mold system.

2. The mold assembly of claim 1, wherein the ophthalmic article is a contact lens or an intraocular lens.

3. The mold assembly of claim 1 or 2, wherein the mold parts are injection molded and have sufficient dimensional stability so that any departures from the intended radius of curvature are within +/−20 microns for all periods of time between one day and six months after production of the mold parts.

4. The mold assembly of claim 3, wherein the clear resin used to make the mold transmits more than 20% of UV light, in the case of a lamp used to cure the lens material.

5. The mold assembly of claim 1, wherein the protective coating comprises a silicon-containing material.

6. The mold assembly of claim 1, wherein the protective coating comprises one or more metal oxides.

7. The mold assembly of claim 1, wherein the protective coating is uniform, continuous, and sufficiently dense to form a barrier to monomer diffusion.

8. The mold assembly of claim 1, wherein the coating has been uniformly applied using plasma-enhanced chemical vapor deposition (PECVD).

9. The mold assembly of claim 1, wherein the coating is between 10 nm and 5 $\mu$m thick and is permanently affixed to the mold surface.

10. The mold assembly of claim 1, wherein the mold is made from a material selected from the group consisting of polyvinyl chloride (PVC), polycarbonate, polystyrene, polyester, polysulfone, polyacrylate, or polymethacrylate.

11. The mold assembly of claim 1, wherein the protective coating comprises silicon oxide, silicon nitride or a material consisting of silicon, oxygen, and nitrogen.

12. The mold assembly of claim 1, wherein the protective coating comprises $TiO_2$ or TiN.

13. The mold assembly of claim 1, wherein the protective coating comprises $Ta_2O_5$.

14. The mold assembly of claim 1, wherein the protective coating comprises $Al_2O_3$.

15. The mold assembly of claim 1, wherein the protective coating comprises multiple layers of different coating materials.

16. The mold assembly of claim 1, wherein each of the mold parts is coated with a different coating material.

17. The mold assembly of claim 1, wherein the inorganic coating contains minor amounts of carbon.

18. A mold assembly for the manufacture of at least one soft contact lens, which mold assembly comprises at least one anterior and one posterior mold part molded from a clear resin that transmits at least 20% of actinic light and has sufficient dimensional stability to limit any deviations from intended radius of curvature to +/−20 microns within any period from one day to six months after mold production, wherein the mold parts each have a protective inorganic coating that is 10 nm to 5 $\mu$m thick, which coating is non-reactive with the lens formed by the mold assembly, and whereby the coating protects the cavity surfaces of the lens mold from chemical attack by the monomers used to form the lens in the mold.

19. The mold assembly of claim 18, wherein the resin used to make the mold has greater dimensional stability and higher light transmittance than polypropylene.

20. The mold assembly of claim assembly 18, wherein the resin is polycarbonate, polyacrylate, or polystyrene.

21. The mold assembly of claim 18, wherein the posterior mold part has a reservoir to collect monomer overflow produced during lens production and wherein the coating has been applied to protect the overflow reservoir as well as the mold cavities.

22. The mold assembly of claim 18, wherein the coating uniformly and continuously covers the lens molds and protects the mold from attack by polyvinylpyrrolidone or dimethylacrylamide monomer.

23. A method of molding an ophthalmic article for use in or on the eye, comprising the following steps:
   a) injection molding the parts of a clear-resin mold assembly comprising at least one anterior and one posterior mold part for production of the ophthalmic article;
   b) permanently affixing a uniform and continuous protective coating of an inorganic material to at least one of the cavity surfaces of the mold parts to protect the surfaces from chemical attack by the monomers used to make the ophthalmic article being molded; and
   c) cast molding at least one ophthalmic article using the mold assembly, wherein its protective coating does not react or coat the surface of the ophthalmic article.

24. The method of claim 23, wherein the ophthalmic article is an intraocular lens or a contact lens.

25. The method of claim 23, comprising the step of selecting a mold resin for a mold part that has sufficient dimensional stability to limit deviations from intended radius of curvature of the mold part to +/−20 microns within a period of one day to six months from the time of producing the mold part.

26. The method of claim 23, comprising applying the protective coating to the mold using a technique that produces a dense, uniform, and continuous protective coating.

27. The method of claim 23, including coating a monomer overflow reservoir along the posterior mold part's circumference with the protective coating to protect the reservoir from monomer chemical attack.

28. The method of claim 23, including applying the coating to the mold using plasma-enhanced chemical vapor deposition (PECVD).

29. The method of claim 23, wherein the inorganic material comprises silicon.

30. The method of claim 28 wherein precursor of the coating comprises carbon even though the inorganic coating produced therefrom contains no carbon or carbon in only minor amounts.

31. The method of claim 23, including the step of coating mold cavity surfaces with multiple layers of different coating materials.

32. The method of claim 23, including applying a different coating material to the cavity surface of each mold part.

33. The method of claim 23, including applying a protective coating to both mold cavities and adjusting the hydrophilic or hydrophobic quality of each protective coating to induce preferential release of the ophthalmic article that is made by the mold assembly.

34. The method of claim 33, wherein the hydrophilic or hydrophobic quality of each protective coating is adjusted by the amount of oxygen, or weight ratio thereof to the precursor compound, used in forming the inorganic coating.

35. The method of claim 23, including applying a coating material capable of transmitting actinic light to the cavity surface of at least one lens mold part through which actinic light energy is directed and applying a second coating material offering substantial protection against monomer interaction but lacking sufficient light energy transmittance to the mold cavity surface of the mold part through which curing energy is not directed.

36. The method of claim 23, wherein the mold assembly is used once to make an ophthalmic article and then discarded.

37. A method of molding at least one soft contact lens comprising the following steps:
   a) injection molding the parts of a clear-resin mold assembly comprising at least one anterior and one posterior lens mold part for contact-lens production, wherein the mold part has sufficient dimensional stability to limit deviations from intended radius of curvature of the mold part to +/−20 microns within a period of one day to six months from the time of producing the mold part;
   b) permanently affixing a uniform and continuous protective coating of an inorganic material to at least one of the cavity surfaces of the mold parts to protect the surfaces from chemical attack by the monomers used to make the lens being molded; and
   c) cast molding at least one contact lens using the mold assembly, wherein its protective coating does not react or coat the lens surface.

38. The method of claim 37, wherein the mold assembly is used once to make an ophthalmic article and then discarded.

39. The method of claim 37, wherein cast molding in part (c) comprises either light or thermal curing or both.

40. The method of claim 37, wherein a glow discharge process is used to apply the inorganic coating to the mold.

* * * * *